(12) United States Patent
Thomas et al.

(10) Patent No.: US 8,769,400 B1
(45) Date of Patent: Jul. 1, 2014

(54) ACCELERATING VIEW TRANSITIONS (75) Inventors: Neil Richard Thomas, Waterloo (CA); Matthew Bolohan, Waterloo (CA)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 13/429,801

(22) Filed: Mar. 26, 2012

(51) Int. Cl.
*G06F 17/00* (2006.01)
*G06F 17/24* (2006.01)

(52) U.S. Cl.
CPC .................................. *G06F 17/248* (2013.01)
USPC ........................................................ 715/235

(58) Field of Classification Search
CPC ... G06F 17/2003; G06F 17/241; G06F 17/24; G06F 17/30749; G06F 17/248
USPC ................................. 715/235, 236
See application file for complete search history.

(56) References Cited

U.S. PATENT DOCUMENTS

| | | | |
|---|---|---|---|
| 5,907,323 A * | 5/1999 | Lawler et al. ................. 725/41 |
| 7,200,801 B2 * | 4/2007 | Agassi et al. ................. 715/202 |
| 7,853,871 B2 * | 12/2010 | Simons et al. ................ 715/238 |
| 8,255,793 B2 * | 8/2012 | Chakrabarti et al. ......... 715/234 |
| 8,508,532 B1 * | 8/2013 | Logan et al. .................. 345/440 |
| 2002/0054126 A1 | 5/2002 | Gamon |
| 2004/0104944 A1 | 6/2004 | Koay et al. |
| 2007/0055940 A1 | 3/2007 | Moore et al. |
| 2008/0120626 A1 | 5/2008 | Graffagnino et al. |
| 2008/0225057 A1 | 9/2008 | Hertzfeld et al. |
| 2008/0225058 A1 | 9/2008 | Hertzfeld et al. |
| 2009/0158179 A1 * | 6/2009 | Brooks ......................... 715/762 |
| 2009/0254572 A1 * | 10/2009 | Redlich et al. ................ 707/10 |
| 2010/0191856 A1 | 7/2010 | Gupta et al. |
| 2011/0055713 A1 * | 3/2011 | Gruenewald et al. ......... 715/738 |
| 2012/0102418 A1 * | 4/2012 | Joy et al. ....................... 715/762 |
| 2012/0159329 A1 * | 6/2012 | Chow et al. ................... 715/716 |
| 2012/0198319 A1 * | 8/2012 | Agnoli et al. ................. 715/202 |
| 2012/0323973 A1 * | 12/2012 | Lin et al. ....................... 707/803 |
| 2013/0125065 A1 * | 5/2013 | Skwirblies .................... 715/862 |

OTHER PUBLICATIONS

Jiao, Wenpin, et al, "Eliminating Mismatching Connections Between Componeta by Adopting an Agent-Based Approach", School of Electronic Engineering and Computer Science, Peking University, Bejing, Proceedings of the 15th IEEE International Conference on Tools with Artificial Intelligence, IEEE Computer Science, 2003, pp. 1-8.*

* cited by examiner

*Primary Examiner* — Laurie Ries
(74) *Attorney, Agent, or Firm* — Shumaker & Sieffert, P.A.

(57) ABSTRACT

A method includes rendering content to provide rendered content including a first content segment and a second content segment, wherein the second content segment includes an indicator of computing device activity; outputting a first view of the rendered content for presentation at a display device, and receiving, at the one or more processors, event information. In response to the event information, the method includes applying at least one hardware accelerated transform to define a second view of the rendered content, where the second content segment, but not the first content segment, is viewable in the second view of the rendered content when the rendered content is presented at the display device, modifying the first content segment, and applying at least one hardware accelerated transform to define a third view of the rendered content subsequent to modifying the first content segment.

21 Claims, 8 Drawing Sheets

ACCELERATING VIEW TRANSITIONS

BACKGROUND

Documents that are displayed by applications such as web browsers, mobile applications, and other applications are commonly created using a markup language, such as Hyper Text Markup Language (HTML). Some web browsers and mobile applications are capable of rendering documents, such as web pages or web applications, using style definitions that are included in one or more Cascading Style Sheets (CSS) that are referenced by the web pages or web applications in the context of an HTML document. Aspects of the appearance of the HTML document can be modified by changing CSS display properties for elements in the HTML document.

In some applications, multiple views are defined by a single HTML document, and, at a given time, one or more of the views is not visible at the display. One method for switching between the multiple views is to modify the CSS display property for an entire view or one or more elements that are associated with the view. This modification can trigger a "reflow," where the web browser (or other application) recalculates the positions and geometries of the elements that are displayed to account for changes resulting from the display property modifications.

SUMMARY

The disclosed embodiments are directed to accelerating view transitions in web applications.

One aspect of the disclosed embodiments is a method that includes rendering content to provide rendered content including a first content segment and a second content segment, and outputting, by one or more processors, a first view of the rendered content for presentation at a display device. The first content segment, but not the second content segment, is viewable in the first view of the rendered content when the rendered content is displayed at the display device. The method also includes receiving, at the one or more processors, event information, and in response, applying, by the one or more processors, at least one hardware accelerated transform to at least one of the first content segment or the second content segment to define a second view of the rendered content, where the second content segment, but not the first content segment, is viewable in the second view of the rendered content when the rendered content is presented at the display device, and outputting, by the one or more processors, the second view of the rendered content for presentation at the display device.

Another aspect of the disclosed embodiments is a method that includes rendering content to provide rendered content including a first content segment and a second content segment, wherein the second content segment includes an indicator of computing device activity, outputting, by one or more processors, a first view of the rendered content for presentation at a display device, where the first content segment, but not the second content segment, is viewable in the first view of the rendered content when the rendered content is displayed at the display device, and receiving, at the one or more processors, event information. In response to the event information, the method includes applying, at a graphics processing unit, at least one hardware accelerated transform to at least one of the first content segment or the second content segment to define a second view of the rendered content, where the second content segment, but not the first content segment, is viewable in the second view of the rendered content when the rendered content is presented at the display device, outputting, by the one or more processors, the second view of the rendered content for presentation at the display device, modifying the first content segment concurrent with outputting the second view of the rendered content for presentation at the display device, applying, at the graphics processing unit, at least one hardware accelerated transform to at least one of the first content segment or the second content segment to define a third view of the rendered content subsequent to modifying the first content segment, where the first content segment, but not the second content segment, is viewable in the third view of the rendered content when the rendered content is presented at the display device, and outputting, by the one or more processors, the third view of the rendered content for presentation at the display device.

Another aspect of the disclosed embodiments is a method that includes rendering content to provide rendered content including a first content segment, a second content segment, and a third content segment, wherein the second content segment includes an indicator of computing device activity, outputting, by one or more processors, a first view of the rendered content for presentation at a display device, where the first content segment, but not the second content segment, is viewable in the first view of the rendered content when the rendered content is displayed at the display device, and receiving, at the one or more processors, event information. In response to the event information, the method includes applying, at a graphics processing unit, at least one hardware accelerated transform to at least one of the first content segment or the second content segment to define a second view of the rendered content, where the second content segment, but not the third content segment, is viewable in the second view of the rendered content when the rendered content is presented at the display device, outputting, by the one or more processors, the second view of the rendered content for presentation at the display device, modifying the third content segment concurrent with outputting the second view of the rendered content for presentation at the display device, applying, at the graphics processing unit, at least one hardware accelerated transform to at least one of the second content segment or the third content segment to define a third view of the rendered content subsequent to modifying the third content segment, where the third content segment, but not the second content segment, is viewable in the third view of the rendered content when the rendered content is presented at the display device, and outputting, by the one or more processors, the third view of the rendered content for presentation at the display device.

Another aspect of the disclosed embodiments is a method that includes rendering content to provide rendered content including a first content segment and a second content segment, wherein the second content segment includes an indicator of computing device activity, outputting, by one or more processors, a first view of the rendered content for presentation at a display device, where the first content segment, but not the second content segment, is viewable in the first view of the rendered content when the rendered content is displayed at the display device, and receiving, at the one or more processors, event information. In response to the event information, the method includes applying, by the one or more processors, at least one hardware accelerated transform to at least one of the first content segment or the second content segment to define a second view of the rendered content, where the second content segment, but not the first content segment, is viewable in the second view of the rendered content when the rendered content is presented at the display device, outputting, by the one or more processors, the second view of the rendered content for presentation at the display device, modifying at least a portion of the rendered content subsequent to outputting the second view of the rendered content for presentation at the display device, and outputting, by the one or more processors, a third view of the rendered content for presentation at the display device, where the second content segment is not viewable in the third view of the rendered content when the rendered content is displayed at the display device.

Another aspect of the disclosed embodiments is a mobile device that includes a display and one or more processors. The one or more processors are configured to render content to provide rendered content including a first content segment and a second content segment. The second content segment includes an indicator of computing device activity. The one or more processors are also configured to output a first view of the rendered content for presentation at a display device, where the first content segment, but not the second content segment, is viewable in the first view of the rendered content when the rendered content is displayed at the display device. The one or more processors are also configured to receive event information, and in response to the event information, apply at least one hardware accelerated transform to at least one of the first content segment or the second content segment to define a second view of the rendered content, where the second content segment, but not the first content segment, is viewable in the second view of the rendered content when the rendered content is presented at the display device, output the second view of the rendered content for presentation at the display device, modify at least a portion of the rendered content subsequent to outputting the second view of the rendered content for presentation at the display device, and output a third view of the rendered content for presentation at the display device, where the second content segment is not viewable in the third view of the rendered content when the rendered content is displayed at the display device.

Another aspect of the disclosed embodiments is a method that includes receiving a document at one or more processors, detecting a plurality of display layers in the document, wherein each display layer includes one or more objects, rendering, at the one or more processors, each display layer from the plurality of display layers, and executing a view transition component that makes one of the layers from the plurality of display layers viewable and makes a different layer from the plurality of display layers non-viewable by applying at least one hardware accelerated transform to one or more display layers from the plurality of display layers. The method can also include outputting, by the one or more processors, a view of the rendered content for presentation at the display device, and displaying the view of the rendered content at the display device.

At least a portion of the document can be encoded in a markup language, such as a markup language that complies with the document object model specification. The view transition component can include a script that is executable by the one or more processors. The view transition component can be a portion of the document. The document can specify a Z-order for the plurality of display layers and the view transition component is operable to modify the Z-order for the plurality of display layers. At least one layer from the plurality of display layers can include an indicator of computing device activity.

BRIEF DESCRIPTION OF THE DRAWINGS

The description herein makes reference to the accompanying drawings wherein like reference numerals refer to like parts throughout the several views, and wherein.

DETAILED DESCRIPTION

When a view transition in a document of a web application triggers a reflow, a delay can be perceived by the user of the web application. This delay, also referred to as "view transition latency", is typically of short duration on the order of 300 msec, but can still be noticeable by the user and can detract from the user experience. The implementations disclosed herein can accelerate view transitions to reduce perceived view transition latency. In some implementations, view transition latency is reduced by applying at least one hardware accelerated transform to effect a view transition between views within a document without triggering a reflow. In some implementations, at least one transform is applied to effect a view transition to a pre-rendered loading view that includes an indicator of computing device activity while the content of the document is modified. For example, the transform is a hardware accelerated transform.

Figure 1:
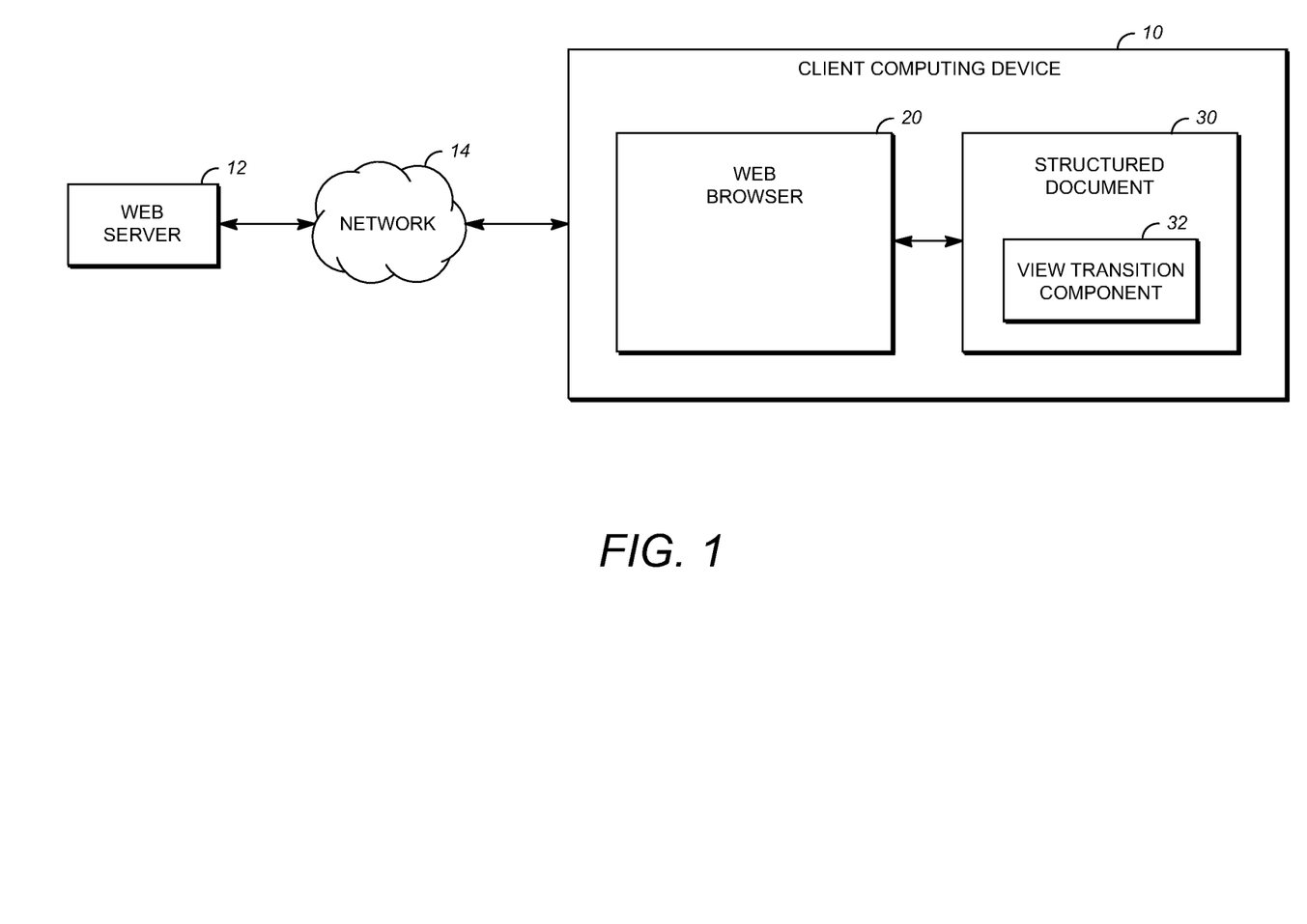
FIG. 1 is a block diagram showing an example of an environment for operation of a system for accelerating view transitions.

FIG. 1 shows an example of an environment for implementing web applications and, in particular, mobile web applications. As shown in FIG. 1, a client computing device 10 and a web server 12 are in communication via a network 14. Each of the client computing device 10 and the web server 12 can be a single system or multiple systems. Each system can be one or more computing devices executing software operable to perform the functionality described herein with respect to the client computing device 10 and the web server 12. The network 14 can allow communication between the client computing device 10 and the web server 12 in any suitable manner.

The client computing device 10 can include a client application which, in one example, is a web browser 20. The web browser 20 can be operable to request objects, including documents, images, data files, or any other kind of data in computer-readable form, from the web server 12. For example, the client computing device 10 can send a request for an object to the web server 12 through the network 14. The request can be, for example, an HTTP GET request that references a URL. In response, the web server 12 can transmit to the client computing device 10 a web page (e.g., HTML and/or additional code) associated with that URL. Further requests for content associated with the web page can transmitted to the web server 12 by the client computing device 10 based on the web page, for example, for transmission of documents, data, or images that are embedded in or referenced by the web page.

In some aspects, the client computing device 10 can be operable to receive, assemble, interpret and/or execute, and render a structured document 30. The structured document 30 can be transmitted to the client computing device 10 by the web server 12 via the network 14, where it is accepted by the web browser 20 as an input. The web browser 20 then provides output to the user. The browser can include a user interface (e.g., that is programmed by client- or server-side scripts) that permits user interaction.

The structured document 30 can describe, for example, a plurality of display elements that, when rendered by the web browser 20, define the content of a web page as well as layout or formatting of the web page. The structured document 30 can be a Hyper Text Markup Language (HTML) document that complies with the Document Object Model (DOM) specification. The structured document 30 can be assembled from multiple documents, such as by using HTML iframes. Other languages and technologies can be utilized by or form part of the structured document 30, such as Extensible Markup Language (XML), Extensible Hypertext Markup Language (XHTML), Cascading Style Sheets (CSS), Java, JavaScript, and the like.

The structured document 30 can include a view transition component 32 in the form of executable code elements that are adapted to be interpreted and executed by the web browser 20. The view transition component 32 can be provided, for example, in the form of JavaScript functions associated with the structured document 30. Operation of the view transition component 32 will be described herein. In some embodiments, the view transition component is separate from the structured document.

Figure 2:
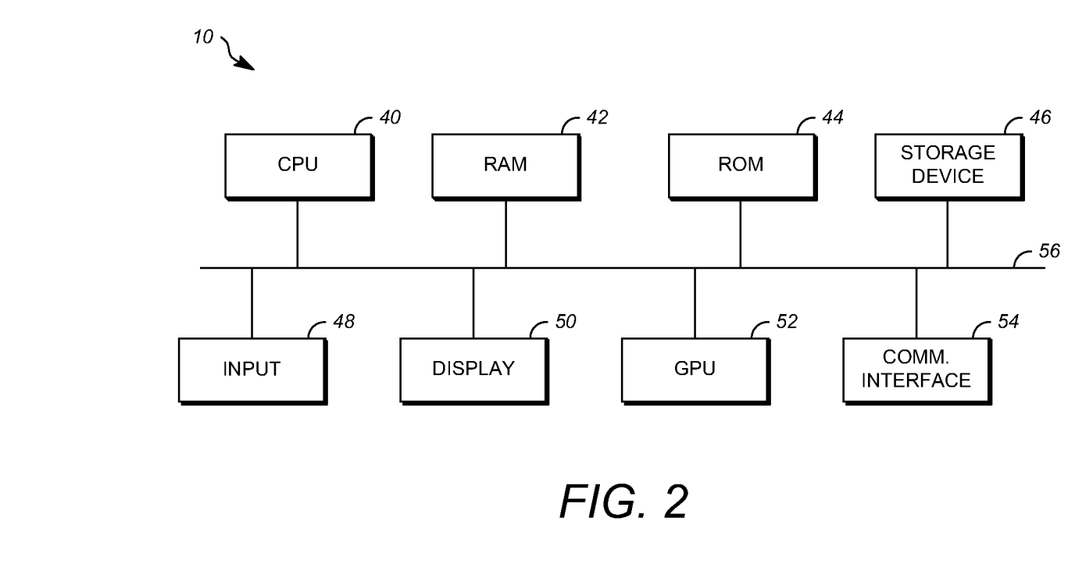
FIG. 2 is a block diagram showing an example of a client computing device, according to an implementation.

The client computing device 10 can be any suitable computer or computing device. As examples, the client computing device 10 can be in the form of a mobile telephone, a tablet computer, a laptop computer, a notebook computer, or a desktop computer. As shown in FIG. 2, the client computing device can include one or more processors, such as a central processing unit (CPU) 40. The client computing device can include memory, such as random access memory (RAM) 42 and a read only memory (ROM) 44. A storage device 46 can be optionally provided in the form of any suitable computer readable medium, such as a hard disc drive, a memory device, a flash drive or an optical drive. One or more input devices 48, such as a keyboard, a mouse, or a gesture sensitive input device, receive user inputs and can output signals or data indicative of the user inputs to the CPU 40. A display device 50, such as liquid crystal display (LCD) or a cathode-ray tube (CRT), allows output to be presented to the user, for example, in response to receiving a video signal. A graphical processing unit (GPU) 52 is provided for direct manipulation of graphics and other images using 2D and/or 3D hardware accelerated functions. The GPU 52 can be operable to assemble, store, manipulate, and/or process hardware accelerated view layers. The GPU 52 can be operable to assemble hardware accelerated view layers with non-hardware accelerated view layers. The GPU 52 can be operable to output data to a frame buffer for transmission to the display device 50. A communication interface 54 can send and/or receive signals and other data from other systems, such as the web server 12. The communication interface 54 can be any manner of wired or wireless communication that is operable to send and receive data or other signals, for example, using the network 14. Some or all of the CPU 40, the RAM 42, the ROM 44, the storage device 46, the input devices 48, the display device 50, the GPU 52, and the communication interface 54 can be connected to one another by an interface such as a bus 56, which transfers data and signals between the components. The bus 56 can include a single bus or multiple buses.

In one example of the client computing device 10, the input devices 48 can include a gesture sensitive input device that is associated with the display device 50 to provide a gesture sensitive display screen. One example of a gesture sensitive input device is a touch sensitive display screen that is operable to display images in response to a video signal and is also operable to register a touch signal that indicates a position on the screen that is touched by a user, e.g., using a finger or a stylus, or that indicates a motion on the screen. Examples of technologies that can be employed to generate the touch signal in response to touches include resistive touch sensing, surface acoustic wave touch sensing and capacitive touch sensing. The gesture sensitive display screen can, in other examples, employ a non-contact technology that is responsive to movements made near the gesture sensitive display screen. As an example, video based non-contact gesture sensing technologies can be used as a basis for implementing the gesture sensitive display screen.

Figure 3A:
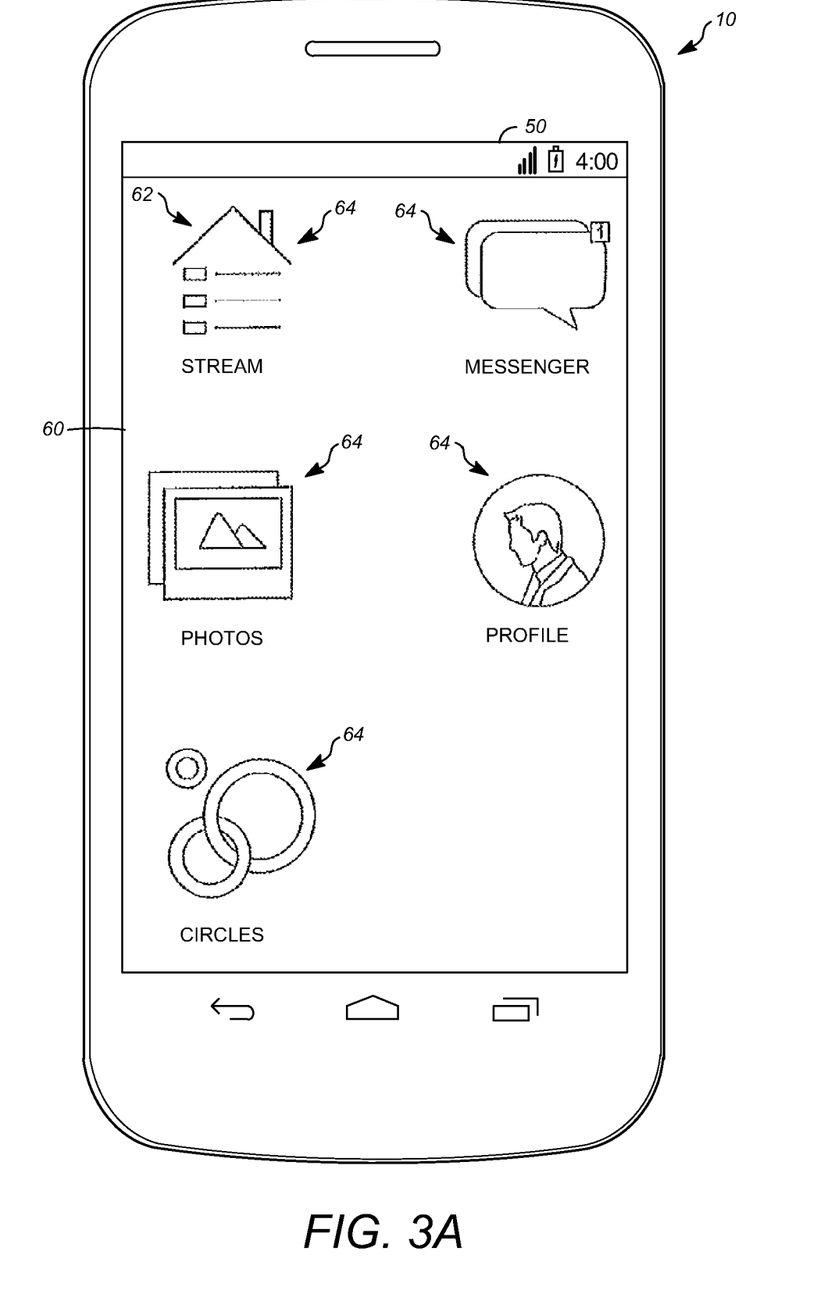
FIGS. 3A-3C are illustrations showing examples of views of rendered content output at a display of the client computing device.

FIG. 3A is an illustration showing a first example of a view of rendered content 60 that is generated by the web browser 20 based on the structured document 30. The rendered content 60 is output at the display device 50 of the client computing device 10. In this example, a navigation view is shown, in which a first content segment 62 of the rendered content 60 is visible the display device 50.

The first content segment 62, in this example, includes icons 64 that can be used by the user of the web application to navigate to other portions of the content that is included in the web application. Content segments, such as the first content segment 62, can correspond to structures in the structured document 30 such as container elements, div elements, or iframes. Other types of structures can also be used to define distinct portions of the structured document 30 that correspond to segments of the rendered content 60.

The rendered content 60 can include one or more hidden content segments, which are not viewable at the display device 50 when the first content segment 62 is viewable. The web browser 20 can alter the display, e.g., in response to a trigger or other activity. An example of a trigger is a user input to user activated functions of the web browser 20, such as scrolling, panning, or zooming within the current view. A portion of the rendered content 60 can be rendered non-viewable, for example, by being positioned outside of a viewable area of the rendered content, by being positioned "behind" another element such that it is hidden from view, or by being scaled to a minute size (for example, a few pixels wide), such that it is illegible. As will be explained herein, portions of the rendered content 60 can be made viewable or non-viewable using the view transition component 32. In one example, as will be explained further, the view transition component 32 can be executed in response to a user selection of one of the icons 64 of navigation view. Other elements of the rendered content 60 or other events or conditions can be used as a basis for causing execution of the view transition component.

Figure 3B:
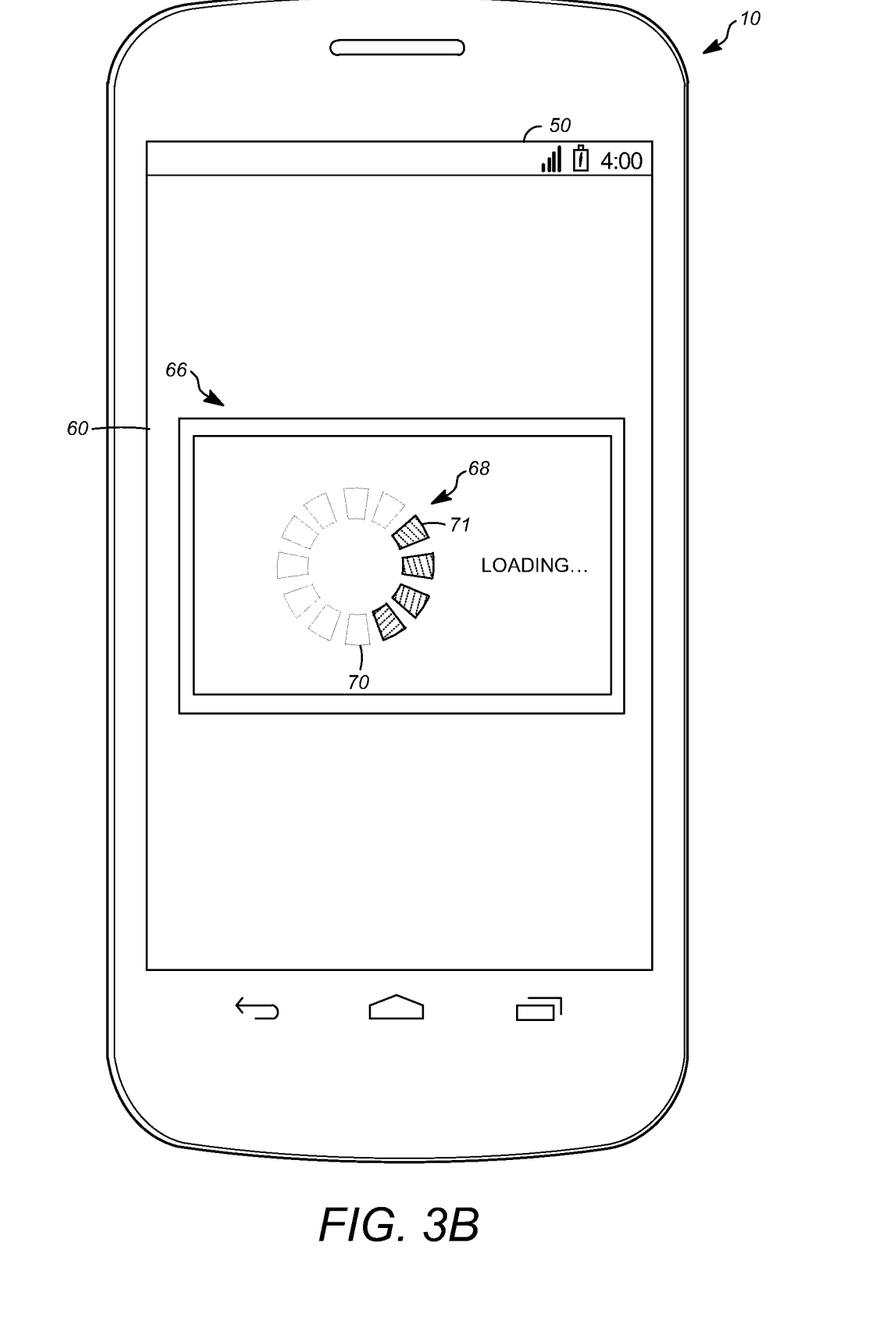

FIG. 3B is an illustration showing a second example of a view of the rendered content 60 that is generated by the web browser 20 and is output at the display device 50 of the client computing device 10. In this example, a loading view is shown, in which a second content segment 66 of the rendered content 60 is visible at the display device 50. In this view, at least a portion of the rendered content 60 can be non-viewable at the display device 50. The second content segment 66, in this example, includes an indicator of computing device activity. The indicator of computing device activity can be any user perceptible indication that signifies to the user that, for example, operations such as data transfers, data processing, rendering or any other operations are currently being performed by the CPU 40 or the web browser 20.

By way of example only, the indicator of computing device activity can be a circular animation 68 that includes a plurality of circumferentially spaced segments 70. The circular animation 68 can be defined by inactive segments 70 and active segments 71, which are animated by changing their states from active to inactive and vice versa in a radial pattern. In one example, the inactive segments 70 are not visible and the active segments 71 are visible, such that the circular animation 68 is shown in the form of a rotating partial arc of a circle. In another example, the coloration of the active segments 71 is different than the coloration of the inactive segments 70. In this example, the coloration of the inactive segments 70 and the active segments 71 can be changed instantly or by gradually changing the intensity. A text legend such as the word "loading", can be included in the second content segment 66, and thus form a part of the indicator of computing device activity.

The circular animation 68 is one example of an indicator of computing device activity, and other examples are possible. As other examples, indicators of computing device activity can include any symbol, color, shape, with or without text, that exhibit movement or motion to connote ongoing or continuing processor or browser activity. Such movement can include changes in one or more of indicator size, color, shape, or combinations thereof. Other animations are possible, e.g., an animation that illustrates the beat or other content of music being played by the device.

Figure 3C:
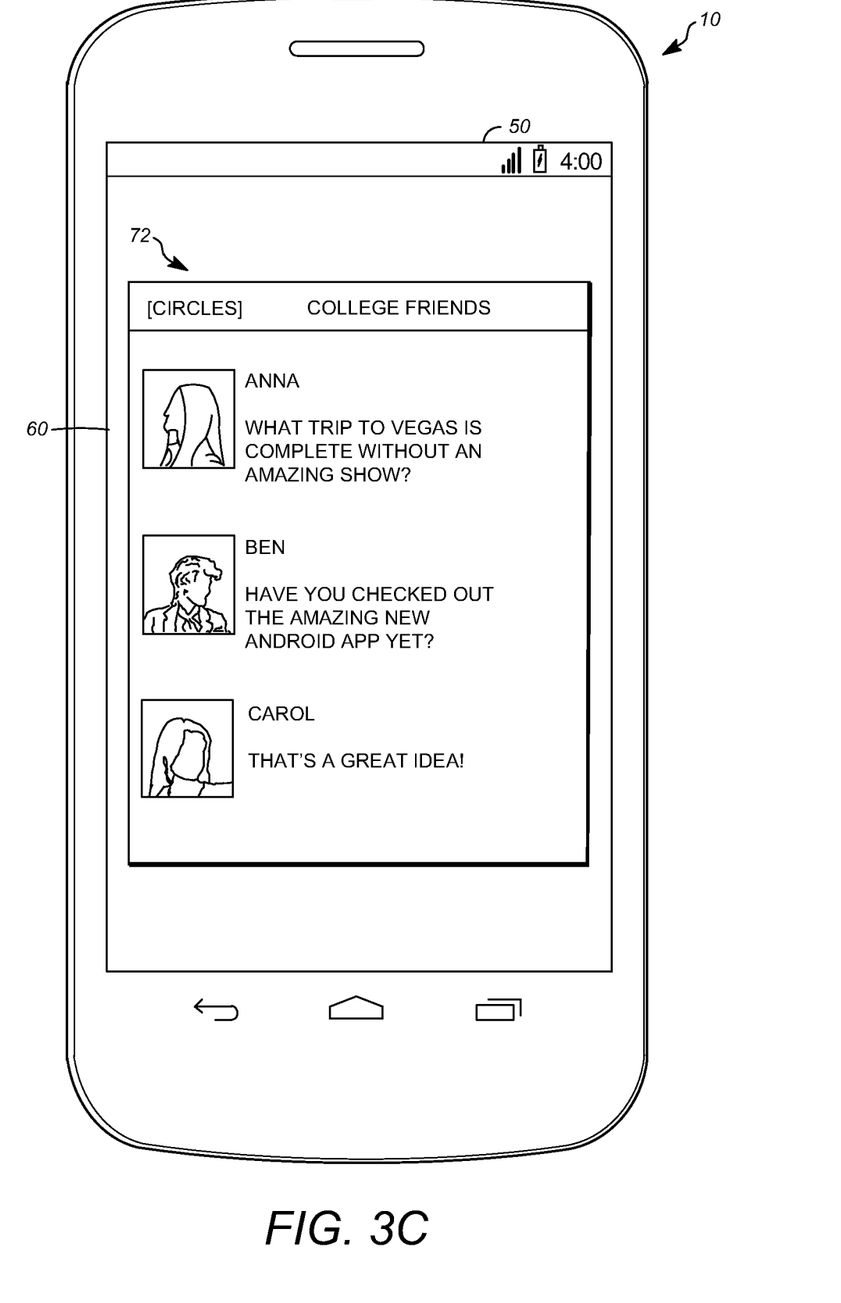

FIG. 3C is an illustration showing a third example of a view of the rendered content 60 that is generated by the web browser 20 and is output at the display device 50 of the client computing device 10. In this example, a news feed view is shown, in which a third content segment 72 of the rendered content 60 is visible. In this view, at least a portion of the rendered content 60 can be non-viewable at the display device 50. The third content segment 72, in this example, includes content that is requested by the user of the web application in response to a user input that selects or otherwise activates a function that is associated with one of the icons 64 of the navigation view.

The view transition component 32 is operable to effect a transition between different views of the web application, such as the navigation view of FIG. 3A and the news feed view of FIG. 3C. The view transition component 32 can generate views of the web application, for example, by applying at least one hardware accelerated transform to one or more portions of the rendered content 60. A hardware accelerated transform is a rendering operation that is performed by dedicated hardware, such as the GPU 52. By defining views in the web application using hardware accelerated transforms in lieu of, for example, performing DOM manipulations or changing CSS properties, the views can be rapidly shown without a browser reflow.

The view transitions described herein can be implemented using a variety of hardware accelerated transforms. As one example, the transition of any of the navigation view of FIG. 3A, the loading view of FIG. 3B or the information feed view of FIG. 3C can be implemented by applying a translation transform at least a portion of the rendered content 60. In this example, a hardware accelerated transform implemented by the GPU 52 can be applied to one or more of the first content segment 62, the second content segment 66 or the third content segment 72 to render the segments viewable or not viewable, thereby defining a view for the web application.

As another example, a scaling transform can be applied to one or more of the first content segment 62, the second content segment 66 or the third content segment 72 to render the segments viewable or not viewable. In this example, a scale factor from 100 to 0 or from 0 to 100 can be applied to one or more of the segments, where 100 represents a full size scale image of either view and 0 represents a minute dot on the display device 50, the size of which is small enough to cause its contents to be completely illegible, and in effect, not visible at the display device 50.

As another example, a scaling transform can be applied to one or more of the first content segment 62, the second content segment 66 or the third content segment 72 to render the segments viewable or not viewable. As another example, a transform can be applied to change the rendering one or more of the first content segment 62, the second content segment 66 or the third content segment 72 to render the segments viewable or not viewable by placing one of the segments "in front of" the other segments to obscure them.

The hardware accelerated transforms that are applied by the view transition component 32 using the GPU 52 can produce an animated view transition. Animated view transitions can be implemented using a single type of hardware accelerated transform, or multiple types of hardware accelerated transforms. Examples of animated view transitions include a slide in/slide out view transition, a slide to cover view transition, and a zoom and fade exchange view transition. An animated view transition can occur during a predefined time period.

The view transition component 32 can be implemented using JavaScript instructions that form a part of the structured document 30. Examples of JavaScript instructions that can be utilized to implement a hardware accelerated translation transform for a Javascript element referencing a view include:
To make the view NOT visible: element.style.webkitTransform="translate3d(−5000 px, −5000 px, 0)"
and
To make the view visible: element.style.webkitTransform="translate3d(0 px, 0 px, 0)
Where the system renders the view of objects in a rectangle bounded by (0 px, 0 px, 0)-(1024 px, 768 px, 0). In this example, the translate3D transform is a hardware accelerated function that is implemented by the WebKit browser engine. As previously noted, other transforms can be used, including hardware accelerated transforms that are implemented by other browser engines or applications other than browsers.

Figure 4A:
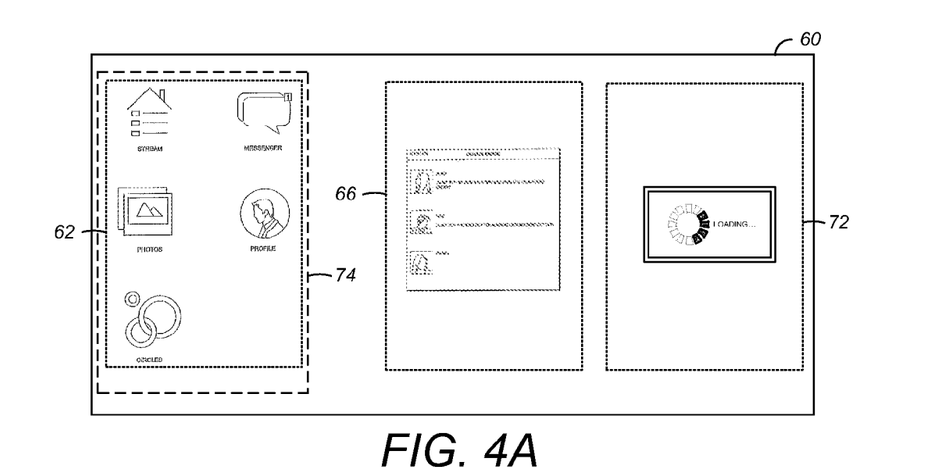
FIG. 4A-4C are illustrations showing examples of view transitions.
Figure 4B:
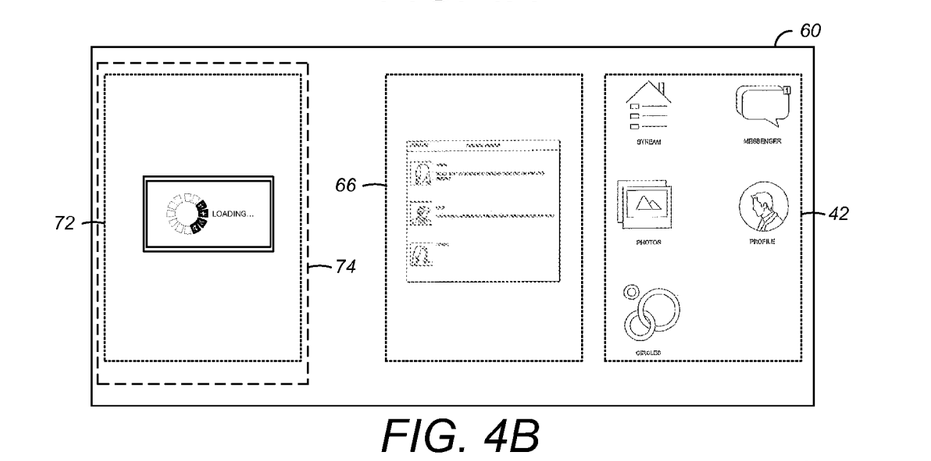
Figure 4C:
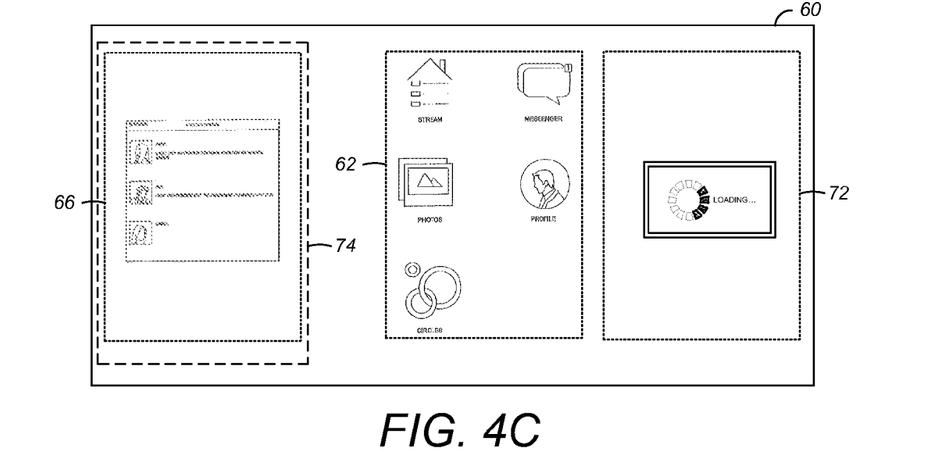

The examples of view transitions in FIGS. 4A-4C use the loading view of FIG. 3B, and the information feed view of FIG. 3C as examples of views. In FIG. 4A, the navigation view of FIG. 3A provides the first content segment 62. The first content segment 62 is positioned within a viewable area 74 of the rendered content 60, and is viewable at the display device 50. The second content segment 66 and the third content segment 72 are positioned outside of the viewable area of the rendered content 60, and are not viewable at the display device 50. The viewable area 74 is the portion of the rendered content that is visible at the display device 50.

FIG. 4B shows the rendered content 60 subsequent to a view transition from the navigation view to the loading view. In FIG. 4B, the loading view of FIG. 3B has been made visible by transforming the first content segment 62 to a position outside of the viewable area 74, and the second content segment 66 to a position within the viewable area 74. The third content segment 72 remains positioned outside of the viewable area 74 in this view.

FIG. 4C shows the rendered content 60 subsequent to a view transition from the loading view to the news feed view. In FIG. 4C, the news feed view of FIG. 3C has been made visible by transforming the third content segment 72 to a position within the viewable area 74 and the second content segment 66 to a position outside of the viewable area 74. The first content segment 62 remains positioned outside of the viewable area 74 in this view.

In another example, the position of the viewable area 74 can be moved instead of moving the first content segment 62, the second content segment 66 and the third content segment 72. One manner in which this can be implemented is by applying a transform to the entirety of the rendered content 60.

The view transition described above with respect to FIGS. 4A-4C can be performed in response to event information, such as information generated in response to a user input that is received at the one or more input devices 48 or any other trigger or event. As an example, the user input could request content, such as the news feed view of FIG. 3C. The view transition component 32 then determines that at least one document modification, such as a DOM or CSS modification, needs to be performed to cause modification of the third content segment 72 in order to prepare the news feed view, and in response, transitions to the loading view, which is displayed until the news feed view is ready, and a second view transition is then performed to the news feed view. If the news feed view is ready when it is requested, the loading view need not be displayed, and a view transition to the news feed view can be performed immediately. A further view transition back to the navigation view can, in this example, be performed without DOM or CSS modifications to the structured document 30, and the transition can be made directly from the news feed view to the navigation view.

Inclusion of the loading view can provide an indication of computing device activity to the user while requested content is prepared. This can enhance the user's experience by reducing perceived latency. In some implementations, the loading view can be omitted. Examples include implementations where DOM or CSS modifications are not performed at the time of a view transition request. Other examples are possible.

A process for accelerating view transitions 100 in a web application will now be described with reference to FIG. 5. In operation 101 the structured document 30 is received at the client computing device 10, e.g., stored at the storage device 46, loaded into the RAM 42, or processed at the CPU 40. In one example, the structured document 30 is transmitted to the client computing device 10 from the web server 12 over the network 14. In another example, the structured document 30 is received at RAM 42 of the client computing device 10 from the storage device 46 of the client computing device 10.

In operation 102, the structured document 30 is rendered, thereby defining the rendered content 60. As previously described, by way of example, the rendered content 60 can include any or all of the first content segment 62, the second content segment 66, the third content segment 72, additional content segments, and/or different content segments.

In operation 103, an initial view is defined. The initial view is the view of the rendered content 60 that is initially output at the display device 50. The content of the initial view can be specified by the structured document 30. In one example, the initial view can be the navigation view of FIG. 3A. In one example, the initial view is output from one or more processors, such as the CPU 40 of the computing device 10 and/or the GPU 52, for presentation at the display 50. The initial view can then be displayed by the display 50.

In operation 104, user inputs, other inputs, conditions, stimuli, and events are monitored to determine whether a view transition should be initiated. For example, a user input can be received at the input devices 48 as, for example, a touch input at a touch sensitive display screen. The input device 48 can generate data or signals indicative of the user input and communicate such data or signals to the CPU 40. The CPU 40 determines whether the user input data or signal or other event corresponds to a view transition request. This can be performed using software instructions that are executed at the CPU 40 such as, for example, an event handler for one of the icons 64 of the navigation view, which can be implemented in the form of executable instructions in the structured document 30. If a view transition request is not received, monitoring can continue at operation 104. The view transition request can be a request for content, such as content that is represented by one of the icons 64. The signals that trigger a view transition request can be unrelated to a user input, e.g., any event, such as an event triggered by an on-board service or a server communication.

In response to receipt of the view transition request, a view transition 105 is executed. The view transition 105 can include applying at least one transform to at least one content segment of the rendered content 60, e.g., a hardware accelerated transform. The at least one hardware accelerated transform can be applied without modifying existing DOM and/or CSS elements to prevent a browser reflow. In an example, a view transition is executed from a first view, such as the navigation view of FIG. 3A, to a second view, such as the news feed view of FIG. 3C, by applying a first hardware accelerated transform to at least one of the first content segment 62 and the third content segment 72. Other operations can be performed in the context of execution of a view transition request at operation 105.

Figure 5:
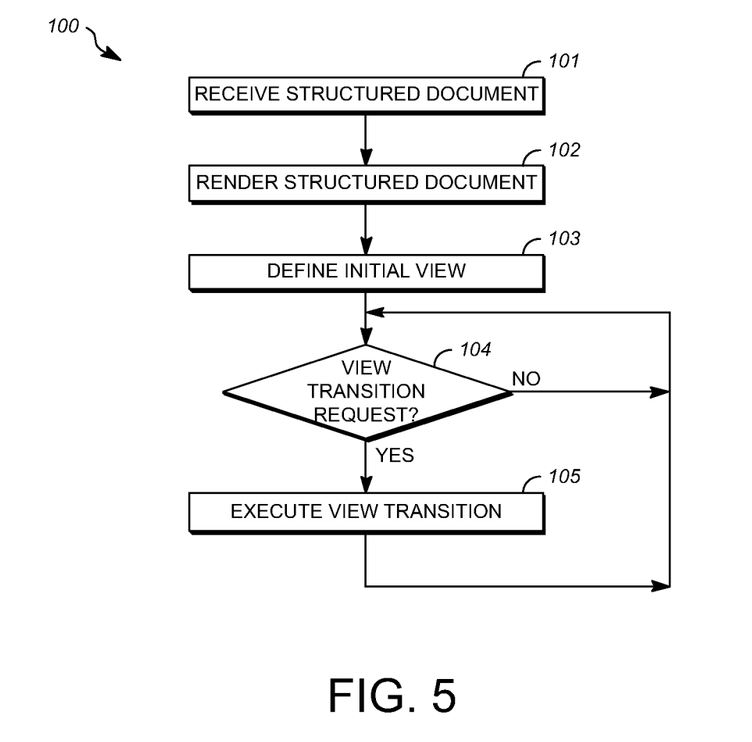
FIG. 5 is a flow chart showing an example of a process for accelerating view transitions.
Figure 6:
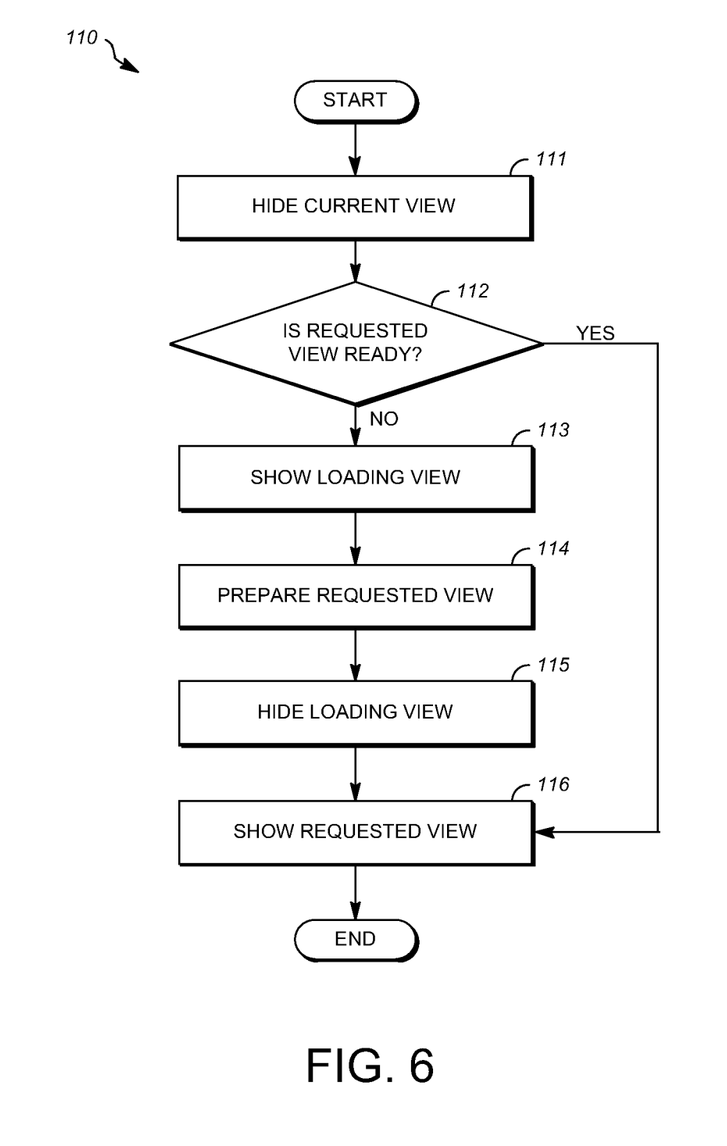
FIG. 6 is a flow chart showing an example of a process for executing a view transition.

As a further example, operation 105 of the process for accelerating view transitions 100 can cause execution of a process for executing a view transition 110, as shown in FIG. 6. This process will be explained with reference to an example in which a first view is the navigation view of FIG. 3A and the requested view is the news feed view of FIG. 3C.

In operation 111 the first view is hidden. Operation 111 can be performed by applying at least one hardware accelerated transform to at least one content segment of the rendered content 60. In this example a hardware accelerated transform, such as a translation transform, is applied to the first content segment 62 to cause it to be non-viewable at the display.

In operation 112 a determination is made as to whether the requested view is ready. This can include, for example, determining whether DOM and/or CSS modifications need to be performed to the requested view before it is displayed. If the requested view is ready, the process proceeds to operation 116 (see below). If the requested view is not ready, the process proceeds to operation 113.

In operation 113, a loading view is shown. This can include outputting a view that includes an indication of computing device activity at the display device 50. In one example, the loading view of FIG. 3B can be output at the display. The loading view of FIG. 3B can be shown, for example, by applying at least one hardware accelerated transform to the second content segment 66 of the rendered content 60. This view is output from one or more processors, such as the CPU 40 of the computing device 10, for presentation at the display 50, and can be displayed by the display 50.

In operation 114, the requested view is prepared, for example, by applying at least one document modification, such as at least one DOM and/or CSS modification to at least a portion of the rendered content 60. This can include, for example, applying at least one DOM and/or CSS modification to the third content segment 72 of the rendered content 60.

Operation 115 can be performed when preparation of the requested view has been completed. In operation 115, the loading view is hidden. This can be performed by applying at least one hardware accelerated transform to at least a portion of the rendered content 60. The at least one hardware accelerated transform can be applied without modifying existing DOM and/or CSS elements to prevent a browser reflow. As one example, the loading view of FIG. 3B can be hidden by applying a hardware accelerated translation transform to the second content segment 66 to move it outside of the viewable area 74 of the rendered content 60.

In operation 116, the requested view is shown. The requested view can be shown by applying at least one hardware accelerated transform to at least the third content segment of the rendered content. In this example, at least one hardware accelerated transform is applied to make the third content segment of the rendered content 60 viewable in viewable area 74 of the rendered content 60. This view is output from one or more processors, such as the CPU 40 of the computing device 10, for presentation at the display 50, and can be displayed by the display 50.

In the foregoing example, the first content segment 62 corresponds to the first view, and the third content segment 72 corresponds to a requested view. In another example, the first content segment 62 corresponds to the first view, and the CPU generates a new view of the content in another content segment with a style modification, e.g., by a CSS modification. In this case, while the first content segment is displayed in the viewable area 74, the new view of the same content is rendered with the style modification as the second content segment in a non-viewable area. When the rendering in the modified style is complete, the second content segment can be transformed to the viewable position.

In still another example, a single content segment can correspond to both the first view and the requested view. In this case, operation 112 of the process for executing a view transition 110 can be omitted. In this alternative example, the first view includes the first content segment, and preparing the requested view at operation 114 can include modifying the first content segment 62 to include content corresponding to the requested view by performing at least one DOM and/or CSS modification to the first content segment 62.

When the process for executing a view transition 110 ends, the process for accelerating view transitions 100 of FIG. 5 can resume, and additional view transitions can be executed as requested.

Also provided is a structured document interpreter which identifies one or more display layers, e.g., alternative display layers in the structured document. For example, the interpreter can recognize different objects within the structured document, and identify their respective z-index properties and render each object in a view corresponding to the appropriate z-index properties. For example, at least some of the objects are rendered in one or more views that are not viewable. At least some of not viewable views can be transformed, e.g., in response to an event, to a viewable position, e.g., as described herein.

Similarly, the interpreter can different objects within the structured document and identify their corresponding layer identifier. Each layer can have an assigned state, e.g., visible or hidden. The interpreter can render each object in a view according the layer to which it is assigned, to provide a view for the visible layer and a not viewable view for each hidden layer. At least some of not viewable views can be transformed, e.g., in response to an event, to a viewable position, e.g., as described herein.

As used herein, the term "computer" means any device of any kind that is capable of processing a signal or other information. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer can include software in the form of programmable code, micro code, and or firmware or other hardware embedded logic. A computer can include multiple processors which operate in parallel. The processing performed by a computer can be distributed among multiple separate devices, and the term computer encompasses all such devices when configured to perform in accordance with the disclosed embodiments.

Each of the client computing device 10, the web server 12, and all other computer-based systems described herein can be implemented in the form of multiple computers, processors, or other systems working in concert. As an example, the functions performed by the web server 12 can be distributed among a plurality of computers, each of which is capable of performing some or all of the functions that are described with respect to the web server 12.

Further, all or a portion of the implementations of the present disclosure can take the form of a computer program product accessible from, for example, a non-transitory computer-usable or computer-readable medium. The non-transitory computer-usable or computer-readable medium can be any tangible device that can, for example, contain, store, communicate, or transport the program for use by or in connection with any processor. The non-transitory computer-usable or computer-readable medium can be, for example, any type of disk including floppy disks, optical disks, CD-ROMs, magnetic or optical cards, application specific integrated circuits (ASICs), or any type of non-transitory media suitable for storing electronic instructions, and each coupled to a computer system bus. For example, any process described herein for providing a view transition can be embodied as computer executable instructions that are stored, for example, at the RAM 42 of the client computing device 10, and can be executed at the CPU 40 to cause execution of any or all of the previously discussed operations.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:

rendering content to provide rendered content including a first content segment and a second content segment, wherein the second content segment includes an indicator of computing device activity;

outputting, by one or more processors, a first view of the rendered content for presentation at a display device, where the first content segment, but not the second content segment, is viewable in the first view of the rendered content when the rendered content is displayed at the display device;

receiving, at the one or more processors, event information; and in response to the event information:

applying, at a graphics processing unit, at least one hardware accelerated transform to at least one of the first content segment or the second content segment to define a second view of the rendered content, where the second content segment, but not the first content segment, is viewable in the second view of the rendered content when the rendered content is presented at the display device, outputting, by the one or more processors, the second view of the rendered content for presentation at the display device, modifying the first content segment while the first content segment is not viewable, applying, at the graphics processing unit, at least one hardware accelerated transform to at least one of the first content segment or the second content segment to define a third view of the rendered content, where the modified first content segment, but not the second content segment, is viewable in the third view of the rendered content when the rendered content is presented at the display device, and outputting, by the one or more processors, the third view of the rendered content for presentation at the display device.

2. The method of claim 1, wherein applying at least one hardware accelerated transform includes applying at least one of a translation transform, a scaling transform, or an opacity transform.

3. The method of claim 1, wherein applying at least one hardware accelerated transform to at least one of the first content segment or the second content segment to define a second view of the rendered content is performed without modifying any of a DOM element or a CSS element corresponding to the rendered content.

4. The method of claim 1, wherein modifying the first content segment while the first content segment is not viewable includes performing at least one of a DOM modification or a CSS modification to the first content segment.

5. A method, comprising:

rendering content to provide rendered content including a first content segment, a second content segment, and a third content segment, wherein the second content segment includes an indicator of computing device activity;

outputting, by one or more processors, a first view of the rendered content for presentation at a display device, where the first content segment, but not the second content segment nor the third content segment, is viewable in the first view of the rendered content when the rendered content is displayed at the display device;

receiving, at the one or more processors, event information; and in response to the event information:

applying, at a graphics processing unit, at least one hardware accelerated transform to at least one of the first content segment or the second content segment to define a second view of the rendered content, where the second content segment, but not the third content segment, is viewable in the second view of the rendered content when the rendered content is presented at the display device, outputting, by the one or more processors, the second view of the rendered content for presentation at the display device, modifying the third content segment while the third content segment is not viewable, applying, at the graphics processing unit, at least one hardware accelerated transform to at least one of the second content segment or the third content segment to define a third view of the rendered content, where the modified third content segment, but not the second content segment, is viewable in the third view of the rendered content when the rendered content is presented at the display device, and outputting, by the one or more processors, the third view of the rendered content for presentation at the display device.

6. The method of claim 5, wherein applying at least one hardware accelerated transform includes applying at least one of a translation transform, a scaling transform, or an opacity transform.

7. The method of claim 5, wherein applying at least one hardware accelerated transform to at least one of the first content segment or the second content segment to define a second view of the rendered content is performed without modifying any of a DOM element or a CSS element corresponding to the rendered content.

8. The method of claim 5, wherein modifying the third content segment while the third content segment is not viewable includes performing at least one of a DOM modification or a CSS modification to the third content segment.

9. A method, comprising:

rendering content to provide rendered content including a first content segment and a second content segment, wherein the second content segment includes an indicator of computing device activity;

outputting, by one or more processors, a first view of the rendered content for presentation at a display device, where the first content segment, but not the second content segment, is viewable in the first view of the rendered content when the rendered content is displayed at the display device;

receiving, at the one or more processors, event information; and in response to the event information:

applying, by the one or more processors, at least one hardware accelerated transform to at least one of the first content segment or the second content segment to define a second view of the rendered content, where the second content segment, but not the first content segment, is viewable in the second view of the rendered content when the rendered content is presented at the display device, outputting, by the one or more processors, the second view of the rendered content for presentation at the display device, modifying at least a portion of the rendered content subsequent to outputting the second view of the rendered content for presentation at the display device, and outputting, by the one or more processors, a third view of the rendered content for presentation at the display device, where the second content segment is not viewable in the third view of the rendered content when the rendered content is displayed at the display device.

10. The method of claim 9, wherein the first content segment is viewable in the third view of the rendered content when the rendered content is displayed at the display device and modifying at least a portion of the rendered content includes modifying the first content segment.

11. The method of claim 9, wherein the rendered content includes a third content segment and the third content segment is viewable in the third view of the rendered content when the rendered content is displayed at the display device.

12. The method of claim 9, wherein the one or more processors includes a graphics processing unit and applying at least one hardware accelerated transform is performed at the graphics processing unit.

13. The method of claim 9, wherein applying at least one hardware accelerated transform includes applying at least one of a translation transform, a scaling transform, or an opacity transform.

14. The method of claim 9, wherein applying at least one hardware accelerated transform to at least one of the first content segment or the second content segment to define a second view of the rendered content includes animating a transition to the second view of the rendered content.

15. The method of claim 9, wherein applying at least one hardware accelerated transform to at least one of the first content segment or the second content segment to define a second view of the rendered content is performed without modifying any of a DOM element or a CSS element corresponding to the rendered content.

16. The method of claim 9, wherein the event information is generated in response to a user input.

17. A mobile device, comprising:
a display; and
one or more processors that are configured to:
render content to provide rendered content including a first content segment and a second content segment, wherein the second content segment includes an indicator of computing device activity;
output a first view of the rendered content for presentation at a display device, where the first content segment, but not the second content segment, is viewable in the first view of the rendered content when the rendered content is displayed at the display device;
receive event information; and
in response to the event information:
apply at least one hardware accelerated transform to at least one of the first content segment or the second content segment to define a second view of the rendered content, where the second content segment, but not the first content segment, is viewable in the second view of the rendered content when the rendered content is presented at the display device,
output the second view of the rendered content for presentation at the display device,
modify at least a portion of the rendered content subsequent to outputting the second view of the rendered content for presentation at the display device, and
output a third view of the rendered content for presentation at the display device, where the second content segment is not viewable in the third view of the rendered content when the rendered content is displayed at the display device.

18. The mobile device of claim 17, wherein the first content segment is viewable in the third view of the rendered content when the rendered content is displayed at the display device and the one or more processors are further operable to modify at least a portion of the rendered content by modification of the first content segment.

19. The method of claim 17, wherein the rendered content includes a third content segment and the third content segment is viewable in the third view of the rendered content when the rendered content is displayed at the display device.

20. The method of claim 17, wherein the one or more processors includes a graphics processing unit and applying at least one hardware accelerated transform is performed at the graphics processing unit.

21. The method of claim 17, wherein applying at least one hardware accelerated transform to at least one of the first content segment or the second content segment to define a second view of the rendered content is performed without modifying any of a DOM element or a CSS element corresponding to the rendered content.

* * * * *